(12) United States Patent
McBarron et al.

(10) Patent No.: US 7,734,584 B1
(45) Date of Patent: Jun. 8, 2010

(54) METHOD AND SYSTEMS FOR STORING AND DISTRIBUTING DATA

(75) Inventors: Brian Patrick McBarron, Export, PA (US); Michael Herf, Studio City, CA (US)

(73) Assignee: Google Inc., Mountain View, CA (US)

( * ) Notice: Subject to any disclaimer, the term of this patent is extended or adjusted under 35 U.S.C. 154(b) by 370 days.

(21) Appl. No.: 11/090,625

(22) Filed: Mar. 24, 2005

(51) Int. Cl.
*G06F 7/00* (2006.01)
*G06F 17/00* (2006.01)
*G06F 15/16* (2006.01)

(52) U.S. Cl. .................................... 707/622; 709/203

(58) Field of Classification Search ............... 709/203, 709/206, 318, 217; 707/10, 1, 705, 609, 707/622; 370/395.2; 375/240.01
See application file for complete search history.

(56) References Cited

U.S. PATENT DOCUMENTS

| | | | | |
|---|---|---|---|---|
| 5,367,698 | A * | 11/1994 | Webber et al. | 709/203 |
| 5,949,551 | A * | 9/1999 | Miller et al. | 358/408 |
| 7,170,999 | B1 * | 1/2007 | Kessler et al. | 380/277 |
| 2001/0002204 | A1 * | 5/2001 | Jebens et al. | 375/240.01 |
| 2003/0009518 | A1 * | 1/2003 | Harrow et al. | 709/203 |
| 2003/0050893 | A1 * | 3/2003 | Hirabayashi | 705/52 |
| 2003/0074403 | A1 * | 4/2003 | Harrow et al. | 709/203 |
| 2003/0233485 | A1 * | 12/2003 | Khan | 709/318 |
| 2004/1026447 | * | 12/2004 | Boulay et al. | 370/395.2 |
| 2005/0138186 | A1 * | 6/2005 | Hesselink et al. | 709/229 |
| 2005/0193068 | A1 * | 9/2005 | Brown et al. | 709/206 |
| 2007/0033262 | A1 * | 2/2007 | Labelle et al. | 709/217 |

FOREIGN PATENT DOCUMENTS

WO    WO 2005/048565    *    5/2005

OTHER PUBLICATIONS

"Proxy Server," From Wikipedia, the free encyclopedia, http://en.wikipedia.org/wiki/Proxy_server, 3 pgs.
"Web Caching Overview," Welcome to Brian D. Davison's Web Caching Resources, http://www.web-caching.com/welcome.html, 3 pgs.
"What's a Web Cache? Why do people use them?," Caching Tutorial for Web Authors and Webmasters: Introduction, http://www.web-caching.com/mnot_tutorial/intro.html, 3 pgs.

(Continued)

*Primary Examiner*—Hung T Vy
(74) *Attorney, Agent, or Firm*—Blakely, Sokoloff, Taylor & Zafman LLP (57) ABSTRACT

Embodiments of this invention store and distribute from a central system units of information corresponding to files distributively stored in a plurality of remote systems. The remote systems may have intermittent network connection. A separate system, which may also have intermittent network connection, may access the units of information on the central system. The separate system may request that the central system transfer a particular file corresponding to a unit of information. The availability of the file on the remote system may be detected. A process may be initiated to send to the file from the remote system to the separate system, either through the central system or bypassing the central system.

8 Claims, 9 Drawing Sheets

OTHER PUBLICATIONS

"How Web Caches Work," Caching Tutorial for Web Authors and Webmasters, http://www.web-caching.com/mnot_tutorial/how.html, 4 pgs.

"What's a Web Cache? Why do People Use Them?" from http://www.web-caching.com/mnot_tutorial/intro.html 3 pages, last modified Oct. 27, 2003 Copyright 1999-2002.

"How Web Caches Work" from http://www.web-caching.com/mnot_tutorial/how.html 5 pages, last modified Oct. 27, 2003.

"Web Caching Overview" from http://www.web-caching.com/welcome.html 3 pages, last modified Jan. 3, 2005.

"Proxy Server" from http://en.wikipedia.org/wiki/Proxy_server 3 pages, last modified Nov. 30, 2004.

* cited by examiner

METHOD AND SYSTEMS FOR STORING AND DISTRIBUTING DATA

TECHNICAL FIELD

The present invention relates generally to the field of data storage and distribution, and in particular, to methods and systems for distributing data between interconnected systems.

BACKGROUND

Networks provide a way for data to be transferred between devices. Various kinds of network architecture exist. One type of network architecture, typically called a file server/client system, provides for a server system which allows one or more client systems connected to the network to store and access files on the server system. A client storing certain data may transfer the data to another client by first transmitting the data over the network to the server. The other client may then retrieve the data over the network from the server. To provide clients with convenient access to store and retrieve data, the server generally is constantly connected to the network.

As demand for server stored data increases, the cost of storing files on server systems may also increase. For example, more storage devices may be needed. Additionally, the server's ability to provide access to and distribute the files may diminish with increasing numbers of requests. Therefore, what is desirable is an improved method and system for storing and distributing files.

BRIEF SUMMARY OF THE INVENTION

In accordance with one embodiment of the invention, a method may store units of information in a first system, wherein each unit corresponds to one of a plurality of files distributively stored in other systems including a second system. The method may include receiving at the first system a first request from a third system, the first request to be for a unit of information corresponding to a file stored in the second system. The method may also include transmitting the unit from the first system to the third system. The method may further include receiving at the first system a second request from the third system, the second request to be for the file stored in the second system. The method may also include detecting availability of the file in the second system. The method may additionally include initiating a process to transfer the file from the second system to the third system.

In accordance with another embodiment of the invention, a machine readable medium may have stored thereon a set of instructions, which when executed, perform a method. The method may include providing a list of files, a file in the list to be a first unit of information corresponding to a remotely stored file. The method may also include indicating on the list current availability of the remotely stored file. The method may further include, in response to a request for a second larger unit of information corresponding to the remotely stored file, initiating a process to electronically transfer the larger unit of information.

In accordance with another embodiment of the invention a method may request at a user system a unit of information from a central system, the unit to be stored in the central system and to correspond to a file stored in a remote system. The method may also include receiving from the central system the unit. The method may further include requesting from the central system a larger unit of information corresponding to the file, the request to initiate detection of availability of the file in the remote system. The method may additionally include receiving at the user system the larger unit.

DETAILED DESCRIPTION

Embodiments of this invention allow users to access files distributively stored in remote decentralized systems. Certain embodiments allow a user to receive incrementally larger portions of the file. For example, a central system (e.g. an online server) may store a catalogue of the information stored on the distributed systems. This catalogue may be based on any unit of information corresponding to the files, including but not limited to metadata and content-based subsets of the files (e.g. low resolution versions of image files). These units of information may be stored in the central system.

Because units of information are located in the central system rather than full files, embodiments of this invention leverage storage space available in the remote systems (e.g. home computers), leaving space in the central system for storage of units of information which correspond to a larger range of files. Additionally, because the units of information are located in a central system, the user may quickly and conveniently access the units of information.

For example, when the units of information are low resolution versions of image files, the user may quickly and conveniently access low resolution versions before retrieving an original full resolution image file. As another example, when the units of information are names of currently available remotely stored files, a user may access a list of the names before viewing content-base subsets of certain named files.

The user may then view larger subsets of a narrower set of those files, and may finally, retrieve and view a full original file from the remote system (e.g. a home computer). In certain embodiments, the user may retrieve the full file directly from the remote system. In other embodiments, the remote system may transfer the full file directly to the user, bypassing the central system.

In certain embodiments, the central system may detect if the full file is immediately available from the remote system. If the file is not available, the server may notify the remote system's administrators of the file request (e.g. via email). In response, in certain embodiments, the remote system may send the file to the requesting user directly or via the central system or another system.

In a specific application of embodiments of this invention, a user may want to share hundreds of digital photographs with friends and family, but may not want to upload these photos from their home computer due to bandwidth and time. Using one embodiment of this invention, users may upload and store a subset of these photos for online previewing. For example, a user may upload low resolution versions of his or her entire photo collection. Because low resolution photos have smaller file sizes than high resolution photos, uploading the subset takes less time. Also, less space is used on a central server to store the subset than would otherwise be used to store full resolution versions of the collection.

Users, and their friends and family, may then access the subsets to preview the images. When someone, e.g. a friend or family member, wants a corresponding full resolution photo, they may request the file from the central system. The central system may then attempt to retrieve the file from the remote system, in this case, the user's home computer. If the file is not available (for example, because the user's computer is turned off or offline), the central system may notify the user to make the file available. When the file becomes available, the central system may get the file and transmit it to the requesting computer (e.g. a friend's computer). If the requesting computer is offline, the central system may wait until the requesting computer is online and then transfer the file. In other embodiments, a user notified of the request may transfer the file directly to the requesting computer, such as through a peer-to-peer transfer system or email, thereby bypassing the central system.

In certain embodiments, the files may be image, video, audio, textual audio/visual or other like document and/or files. For example, an online server may store excerpts of word processing documents and/or clips of songs, and may retrieve full document and/or complete song from a remote system on demand in response to a user request for the full version. Additionally, a server may cache the full version if the full version is frequently requested. Therefore, known caching technology may be used in conjunction with embodiments of this invention. Details and variations of these processes and systems will be described in further detail below.

Process

Figure 1:
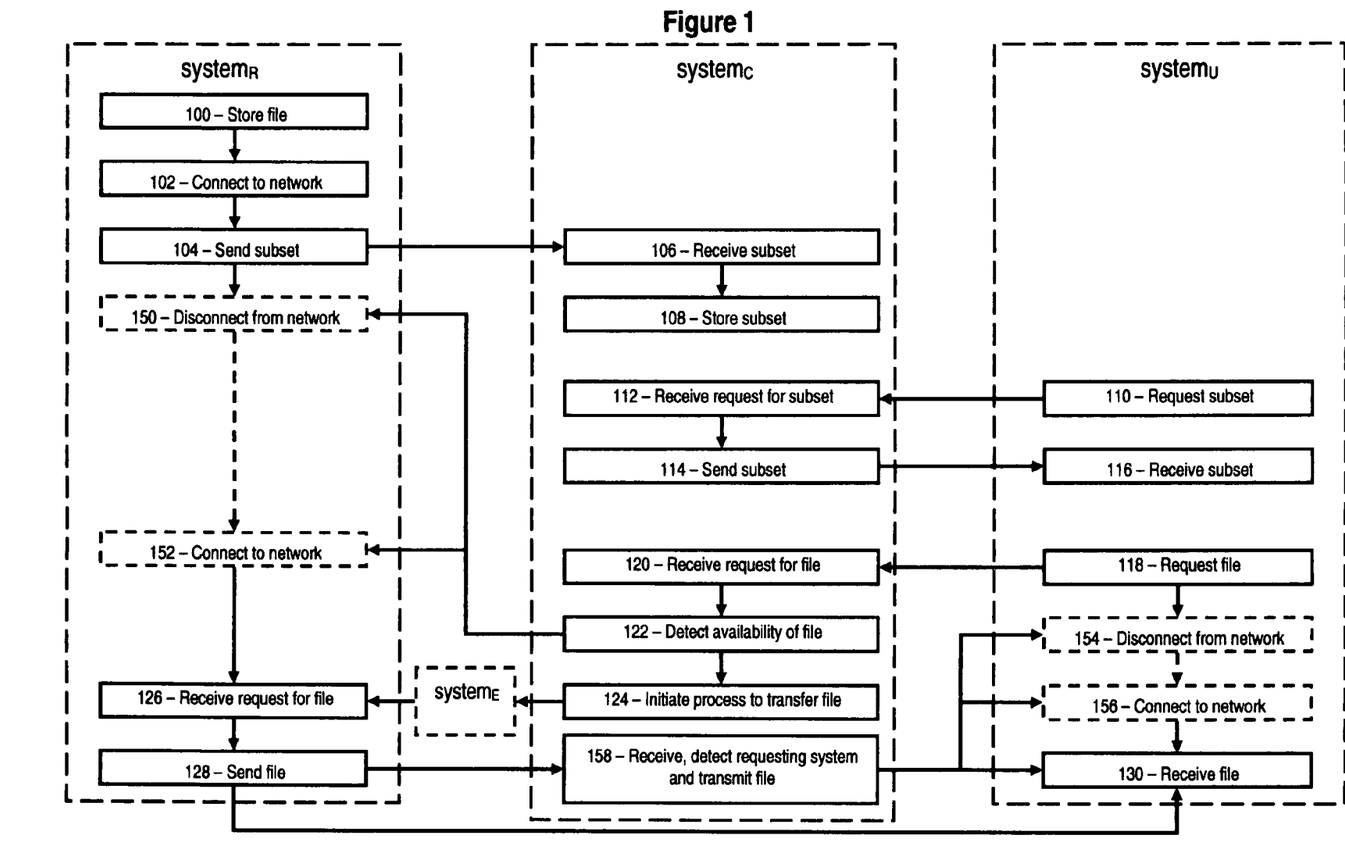
FIG. 1 depicts a flow diagram of storage and distribution of a file and a subset of the file in accordance with one embodiment of the invention.

FIG. 1 depicts a flow diagram of storage and distribution of a file and a subset of the file in accordance with one embodiment of the invention. Although FIG. 1 focuses on three systems (system$_R$, system$_C$ and system$_U$) to facilitate discussion, it will be appreciated that more than three systems are generally involved. In particular, a unit of information distributed by system$_C$ may be correlated with any one of a plurality of files distributively stored in systems similar to system$_R$ (e.g. system$_{R1}$, system$_{R2}$ and system$_{R3}$ shown in FIG. 6 and described in further detail below).

Furthermore, although FIG. 1 focuses on storage and distribution of a content-related subset of a file to facilitate discussion, it will be appreciated that any unit of information correlating to the file, including but not limited to metadata, may be stored and distributed in such a manner. Therefore, reference to "subset" herein is illustrative and is not intended to be limiting.

System$_R$ is a remote system (e.g. a home computer) that stores files. System$_R$ is capable connecting to a network to communicate with system$_C$.

System$_C$ is a central system (e.g. an online server) that stores and distributes subsets of the files stored in system$_R$. System$_C$ may be any system capable of receiving and transmitting data over a network (e.g. network 610 in FIGS. 6 and 7). In FIG. 1, system$_C$ distributes subsets received from system$_R$ to system$_U$.

System$_U$ is a user system (e.g. another home computer, a friend's computer, work computer, mobile phone, thin client, personal digital assistant or the like) that accesses the subsets stored in system$_C$. System$_U$ may occasionally request a file stored on system$_R$. In certain embodiments, system$_U$ may be a thin client with limited file storage capacity. In other embodiments, system$_U$ may be capable of significant file storage capacity, similar to system$_R$. Therefore, it will be appreciated that, in certain embodiments, system$_R$ may also be a user system and system$_U$ may also be a remote system.

In block 100, system$_R$ (e.g. a home computer) stores a file. As detailed below, the file may include any collection of bits presented as an individual entity. For example, the file may be an image, a song, a movie or a document. The file may have been downloaded from another device, e.g. a digital camera, a MPEG-1/2 Audio Layer 3 (MP3) player, video recorder, or hard drive. The file may also have been created on the system$_R$, e.g. by using an image or document editor.

In block 102, system$_R$ connects to a network (e.g. network 610 in FIGS. 6 and 7, as will be described in more detail below). In block 104, system$_R$ transmits a subset of the file to system$_C$ (e.g. an online server) for storage and distribution. The subset of the file may be a version or portion of the file. For example, in certain embodiments, the subset may be an extracted, abbreviated or abridged version the file, e.g. a lower resolution version of a digital image or a summary of a word processing document. The subset may also be a truncated version of the file. For example, the subset may be a clip of an audio file, a clip of a video file, a page of a word processing document, a page within a set of related computer-aided design (CAD) format files, a spreadsheet in a spreadsheet workbook or a slide in a slideshow.

In block 106, system$_C$ (e.g. an online server) receives the subset. System$_R$ may then disconnect from the network, as shown by dash-lined block 150.

In block 108, system$_C$ stores the subset. In certain embodiments, system$_C$ may include a database which stores subsets of files. In other embodiments, the subset may be stored in a separate system coupled to system$_C$. For example, system$_C$ may transfer the subsets to a dedicated data storage system (not shown).

The subset may be stored in nonvolatile memory, such as a hard disk, compact disc (CD), digital video disc (DVD), floppy disk, magnetic tape, flash disk, or read only memory (ROM). In certain embodiments, the subset may be stored in volatile memory, such as dynamic random access memory (DRAM), synchronous DRAM (SDRAM), or content addressable memory (CAM).

As previously mentioned, system$_C$ may distribute the subset to various systems (e.g. to system$_U$). In certain embodiments, system$_C$ may actively distribute the subset by advertising the availability of the file to other systems within, for example a trusted or public network. In other embodiments, system$_C$ may alternatively or additionally distribute the subset passively by making access available to those informed of the subset through other means (e.g. via email, telephone or face-to-face interaction). For example, a user of system$_R$ may inform a user of system$_U$ that vacation photos are available via email. The system$_U$ user may then access the subsets (e.g. low resolution versions) of those photos on system$_C$ (e.g. an online server).

In certain embodiments, distribution of the subsets may include detection of the current availability of the corresponding file and indication of that current availability. For example, system$_C$ may distribute the subset by providing a list of subsets and indicating which of corresponding files are currently available from a remote system (e.g. system$_R$), as shown and discussed in further detail with regard to FIGS. 4A through 5B.

In block 110, system$_U$ (e.g. a friend's computer) requests a subset from system$_C$, e.g. for viewing. In block 112, system$_C$ receives the request and sends the subset in block 114. System$_s$ may use protocols such as hypertext transfer protocol (HTTP) and/or other protocols detailed below to send the subset. In certain embodiments, system$_C$ may require secure access or security privileges before sending the subset to system$_U$. For example, system$_C$ may ask for a username and password and compare that to a security/privileges database before fulfilling the request to transmit the subset. In block 116, system$_U$ (e.g. a friend's computer) receives the subset.

While system$_U$ has access to the subset, system$_R$ need not be connected to the network, as shown by block 150. Thus, embodiments of this invention allow systems like system$_R$ to have an intermittent network connection while still providing access to some form of the content stored in system$_R$. That is, embodiments of this invention allow users using system$_U$ to view versions of files stored in system$_R$ while system$_R$ is offline.

As a specific example, in one embodiment, a user may store hundreds of digital photographs on a home computer, which is intermittently connected to the Internet. Although the user may not want their home computer to be persistently online, the user may want to share their photographs online with friends and family around the clock. Additionally, the user may not want to upload full resolution versions of their photo collection due to restraints on bandwidth and time. Using embodiments of this invention, the user may upload and store on system$_C$ (e.g. an online server) subsets of those photos, such as lower resolution versions of the photos. System$_C$ may allow others to view the subsets while system$_R$ (e.g. a home computer) is offline, thus providing access to some form of the contents stored on system$_R$ (e.g. the home computer).

In certain situations, such access may be sufficient to satisfy someone using system$_U$, e.g. a friend or family member. For example, viewing a lower resolution image may be sufficient, and even preferred, for browsing an online photo album. In other situations, the person may want access to the full or original file. For example, a user may want access to a full resolution photo for printing. System$_s$ (e.g. the friend's computer) may then send a request to system$_C$ (e.g. the online server) for the file, as shown in block 118. In certain embodiments, the request sent to system$_C$ for the file may include security information, e.g. information to access system$_R$. After requesting the file, system$_s$ may or may not disconnect from the network, as shown by dash-lined block 154.

In response to receiving the request for the file in block 120, system$_C$ may detect the availability of the file in block 122. This detection may be done using methods and systems such as those described in co-pending and commonly assigned U.S. patent application Ser. No. 11/089,915, entitled "Methods and Apparatuses for Identification of Device Presence," filed on Mar. 24, 2005, herein incorporated by reference in its entirety. For example, unique machine identifiers may be assigned to a machine storing the requested file. System$_C$ may be able to detect the network status of the machine, regardless of user log-in. For example, system$_C$ may detect whether the machine storing the requested file is online, whether certain ports are open and/or secure and whether the file remains stored in the machine.

The detection may show that system$_R$ is disconnected from the network, as shown in FIG. 1 by the arrow from block 122 to block 150. Alternatively, the detection may show that the system$_R$ is connected to the network, as shown in FIG. 1 by the arrow from block 122 to block 152.

The result of this detection is delivered to block 124 and determines the type of process to be initiated to transfer the file from system$_R$ to system$_U$. The process may include, for example, transmitting a request for the file to an external system, e.g. system$_E$ (e.g. an email, chat, instant messenger and/or telephone system). Various examples of processes to initiate transfer of the file from system$_R$ to system$_U$ will be described in more detail below.

System$_R$ receives the request for the file in block 126. Depending on the process initiated in block 124, the request may be received from system$_C$, system$_E$ and/or another system (not shown).

In block 128, system$_R$ sends the file. In certain embodiments, system$_R$ may send the file to system$_C$ (e.g. an online server) for distribution to system$_U$, as shown by the arrow from block 128 to block 158. In other embodiments, system$_R$ may bypass system$_C$ and send the file directly to system$_U$, as shown by the arrow from block 128 to block 130.

In embodiments in which system$_R$ sends the file to system$_C$, the file may be transferred between systems which may or may not be online simultaneously. For example, system$_R$ (e.g. the home computer) may be usually online during the evenings while system$_U$ (e.g. a work computer) may be usually online during business hours. System$_R$ (e.g. the home computer) may transfer the file to system$_C$ and then disconnect from the network joining them. System$_s$ may then wait for system$_U$ (e.g. the work computer) to connect to the network before transferring the file to system$_U$. In certain embodiments, system$_C$ may detect the network presence of system$_U$, as shown by the arrows connecting block 158 to blocks 154 and 156.

Embodiments in which files are transferred via system$_C$ may be desirable even if system$_R$ and system$_U$ are online simultaneously. For example, system$_U$ and system$_C$ may have established a transmission control protocol (TCP) connection when system$_U$ initially requested a subset or a file from system$_C$. This connection may remain open while system$_C$ obtains the file from system$_R$. In certain embodiments, system$_C$ may relay the file to system$_U$ as portions of the file arrive from system$_R$. In other embodiments, system$_C$ may relay the file to system$_U$ after the complete file arrives. Once file transfer to system$_U$ is complete, the TCP connection may be closed. Therefore, in certain embodiments, system$_C$ may transfer the file (or parts thereof) to system$_U$ without explicitly detecting system$_U$'s network presence.

In embodiments in which system$_R$ bypasses system$_C$, the file may be sent directly to system$_U$, as shown by the arrow from block 128 to block 130. For example, system$_R$ may transfer the file to system$_U$ via a peer-to-peer connection. In other embodiments, system$_R$ may bypass system$_C$ by sending the file to system$_U$ via another system, e.g. system$_E$ or one or more systems not shown.

As can be understood from FIG. 1, after system$_U$ receives the file in block 130, the file exists in both system$_R$ and system$_U$. In certain embodiments, after transferring the file to system$_U$, system$_C$ may not cache the file but rather delete the file from local storage. In other embodiments, system$_C$ may cache the file for a certain period of time before deleting the file. The subset of the file may remain stored in system$_C$ for further distribution to other systems.

EXAMPLES

The following provides variations and examples of various aspects of the invention. It will be appreciated that the following variations and examples are not intended to be exhaustive or to limit the invention to the precise forms disclosed. These variations and examples are to provide further understanding of the present invention.

Figure 2A:
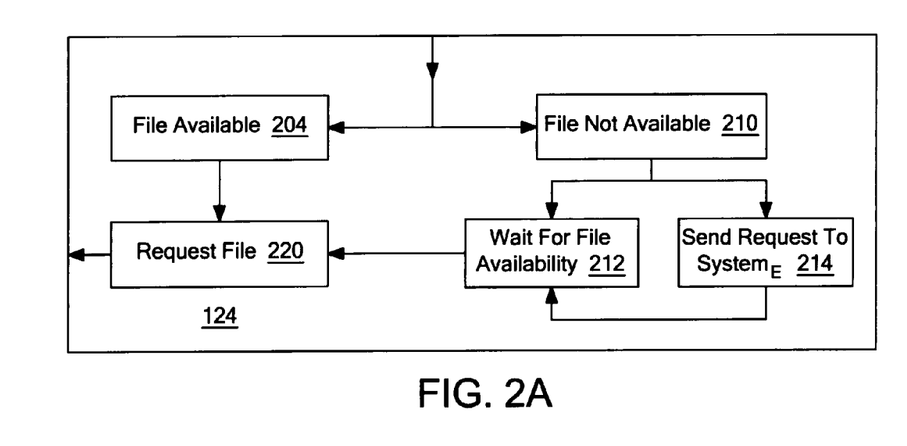
FIG. 2A depicts a flow diagram of an initiation of a process to transfer a file in accordance with one embodiment of the invention.
Figure 2B:
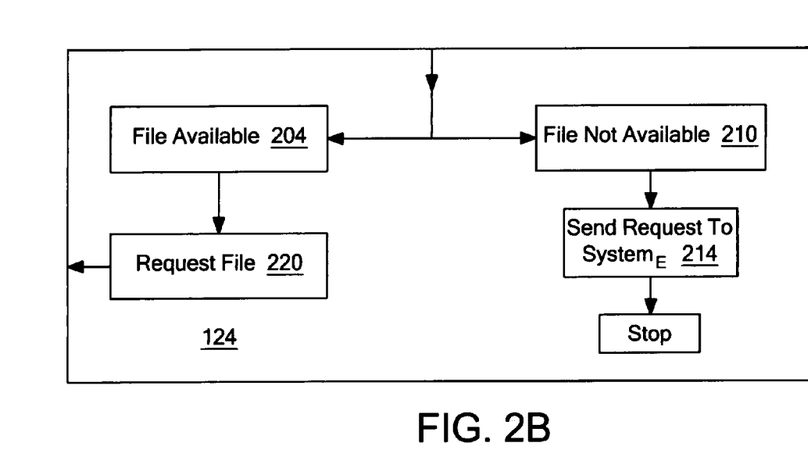
FIG. 2B depicts a flow diagram of an initiation of a process to transfer a file in accordance with another embodiment of the invention.

FIGS. 2A and 2B illustrate alternative processes for initiating transfer of the requested file from system$_R$ to system$_U$. Specifically, FIG. 2A depicts a flow diagram of an initiation of a process to transfer a file in accordance with one embodiment of the invention. In FIG. 2A, the results of the detection enter block 124. If the file is available, as shown in block 204, then system$_C$ sends a request to system$_R$ in block 220.

If the file is not available, as shown in block 210, in one embodiment, system$_C$ waits for the file to become available in block 212, and then sends the request for the file in block 220. For example, system$_C$ may periodically check for the file's availability on system$_R$. In another embodiment, system$_C$ may have access to a time scheduled for system$_R$ to come online, and may check for the file availability after such time. In another embodiment, system$_C$ may determine or have access to a pattern of online behavior and check for file availability according to that pattern. For example, system$_R$ may have informed system$_C$ that it typically connects to the network after 5 pm, after which time system$_C$ checks for file availability.

Alternatively, in another embodiment, if the file is not available, system$_C$ may send in block 214 a request to another system, e.g. system$_E$. This request may include a notice or message informing an administrator of system$_R$ of the request. For example, as previously suggested, the request may be an email, voice mail, text message, chat message, instant message, telephone call or page. This request may ask the administrator to make the file available by connecting to the network. This request may also include information regarding the system and/or user requesting the file. Additionally, this request may include information to allow system$_R$ to send the file directly to system$_U$. In FIG. 2A, after sending the request to system$_E$, system$_C$ waits for the file to become available in block 212, before requesting the file in block 220.

FIG. 2B depicts a flow diagram of an initiation of a process to transfer a file in accordance with another embodiment of the invention. As in FIG. 2A, in the embodiment of FIG. 2B, if the file is available, then system$_C$ sends a request to system$_R$ for the file. If the file is not available, however, the system does not wait for the file to become available in this embodiment. Rather, in block 214, the system sends a request to another system (e.g. system$_E$) to inform system$_R$ of the request. After sending the request to the other system (e.g. system$_E$), system$_C$ ends its involvement with the transfer initiation process. In such embodiments, system$_R$ may subsequently transfer the file directly to system$_U$. Alternatively, system$_R$ may request the file be stored in system$_C$ to allow system$_U$ to subsequently retrieve the file from system$_C$.

Figure 3A:
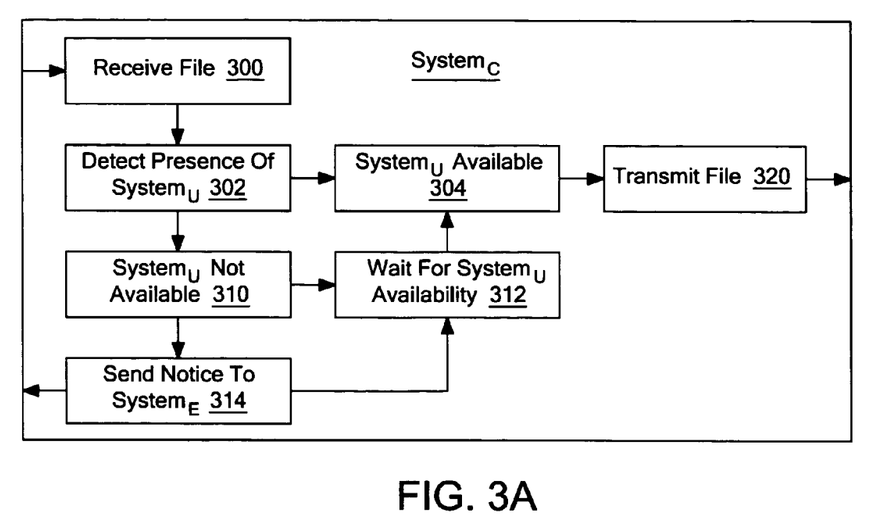
FIG. 3A depicts a flow diagram of reception and transmission of a file in accordance with one embodiment of the invention.
Figure 3B:
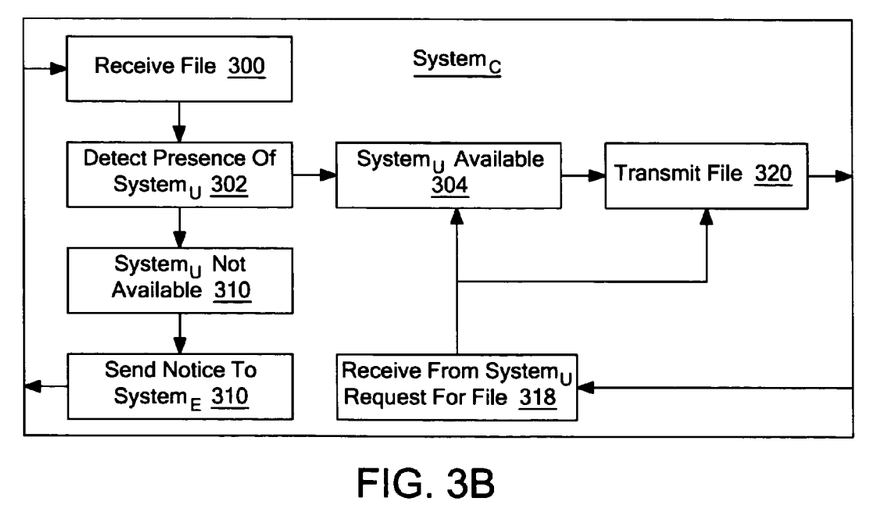
FIG. 3B depicts a flow diagram of reception and transmission of a file in accordance with another embodiment of the invention.

FIGS. 3A and 3B illustrate alternative processes for receiving and transmitting the requested file from system$_R$ through system$_C$ to system$_U$. Specifically, FIG. 3A depicts a flow diagram of reception and transmission of a file in accordance with one embodiment of the invention. In FIG. 3A, system$_C$ receives the file in block 300 from system$_R$. In block 302, system$_C$ detects the presence of the requesting system, e.g. system$_U$. If the system is available, as shown in block 304, then system$_C$ transmits the file to system$_U$ in block 320.

If the requesting system is not available, as shown in block 310, system$_C$ may wait for the requesting system to become available in block 312. Similar to the discussion above with reference to FIG. 2A, in certain embodiments, system$_C$ may periodically check for the availability of a system, in this case system$_U$. In another embodiment, system$_C$ may have access to a time scheduled for system$_U$ to come online and may check for the file availability after such time. For example, after requesting the file and before disconnecting to the network, system$_U$ may inform system$_C$ of the next time system$_U$ is likely to come online. In another embodiment, system$_C$ may determine a pattern of online behavior and check for file availability according to that pattern. For example, system$_C$ may determine that system$_U$ typically connects after 9 am, and may check for the available of system$_U$ after such time.

Alternatively, if the file is not available, in another embodiment, system$_C$ may send in block 314 a notice to another system, e.g. system$_E$. Similar to the discussion above, the notice may be contained in an email, voice mail, text message, chat message, instant message, telephone call or page, for example. This notice may inform an administrator of system$_U$ of the file's availability. For example, this notice may include information regarding the file's availability on system$_C$, such as the length of time the file will be stored on system$_C$ for retrieval. Alternatively, this notice may include a schedule of times during which the file may be available directly from system$_R$. The notice may also include security information to allow only the recipient of the notice to access the file. In FIG. 3A, after sending the request to system$_E$, system$_C$ waits for system$_U$ to become available in block 312. After system$_U$ becomes available, system$_C$ transmits the file to system$_U$ in block 320.

FIG. 3B depicts a flow diagram of reception and transmission of a file in accordance with another embodiment of the invention. Again, system$_C$ receives the file in block 300 from system$_R$. In block 302, system$_C$ detects the presence of the requesting system, e.g. system$_U$. If the system is available, as shown in block 304, then system$_C$ transmits the file to system$_U$ in block 320.

If the requesting system is not available, in the embodiment of FIG. 3B, system$_C$ does not wait for the requesting system to become available, but rather sends a notice in block 314 to another system, e.g. system$_E$. This notice may be similar to the notice of FIG. 3A. This notice may also inform the administrator to reconnect to the network and to send another request to system$_C$ for the file. As previously suggested, the file may exist in system$_C$ for a temporary period of time, e.g. a week. Alternatively, the file may exist in system$_C$ until system$_U$ retrieves the file or until system$_C$ is directed to remove the file. Additionally, in certain embodiments, system$_C$ may cache the file if the file is frequently requested. In such embodiments, system$_C$ may check the cache for files before attempting to transfer files from remote systems, e.g. system$_R$. If the file is available, system$_C$ may send the file to system$_U$ without including system$_R$ in the remaining transfer process.

In block 318, system$_C$ may receives a request for the file in response to the notice. System$_S$ may transmit the file to system$_U$ without rechecking system$_U$'s availability, as shown by the arrow from block 318 to block 320. In certain embodiments, system$_C$ may recheck for the availability of system$_U$, as shown by the arrow from block 318 to block 304, e.g. in cases prone to unexpected network disconnections.

Screenshots

FIGS. 4A through 5B illustrate various ways in which subsets and files may be distributed to various systems, e.g. system$_U$. Although FIGS. 4A through 5B are directed toward audio, image and video files, it is to be appreciated that the other files are generally equally applicable.

Figure 4A:
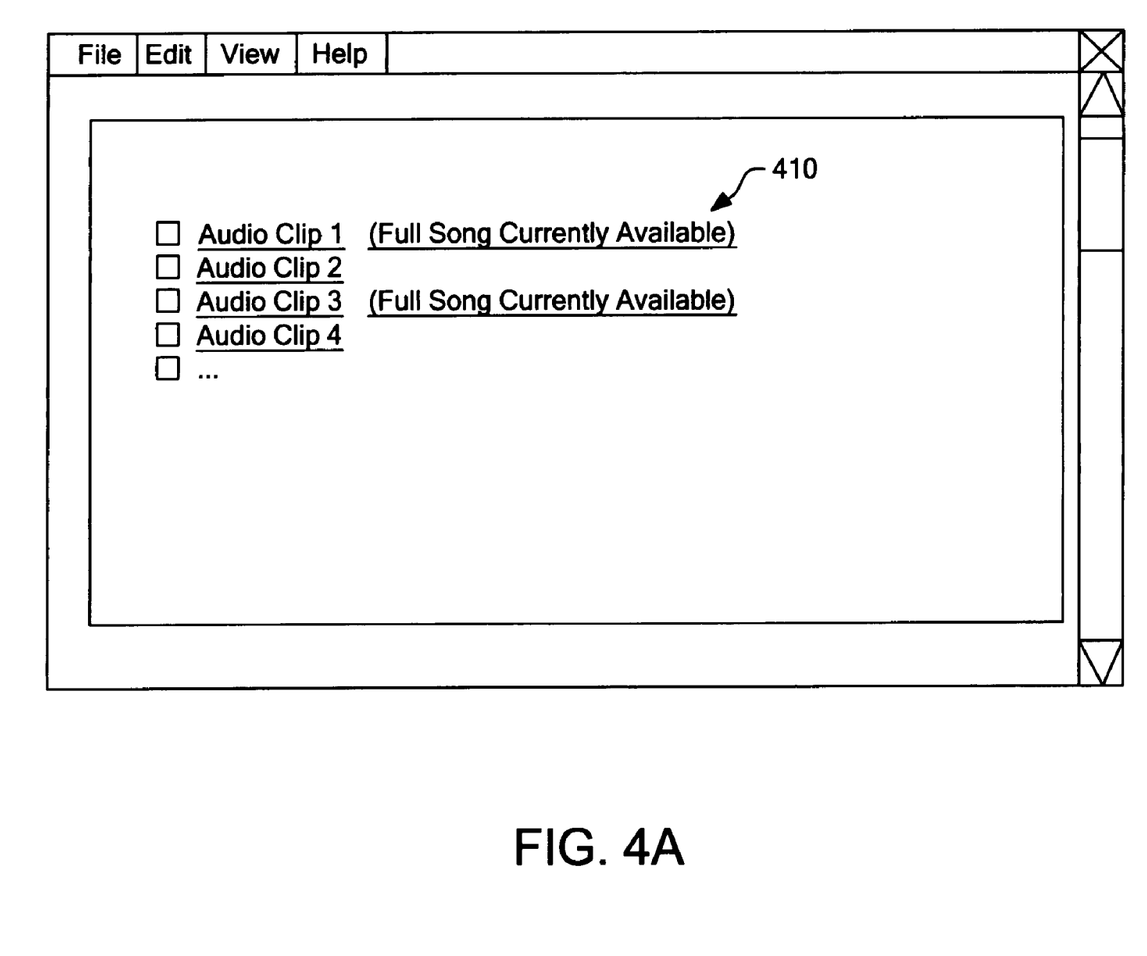
FIG. 4A depicts a screenshot of a list of subsets with current availability of corresponding files indicated in accordance with one embodiment of the invention.
Figure 4B:
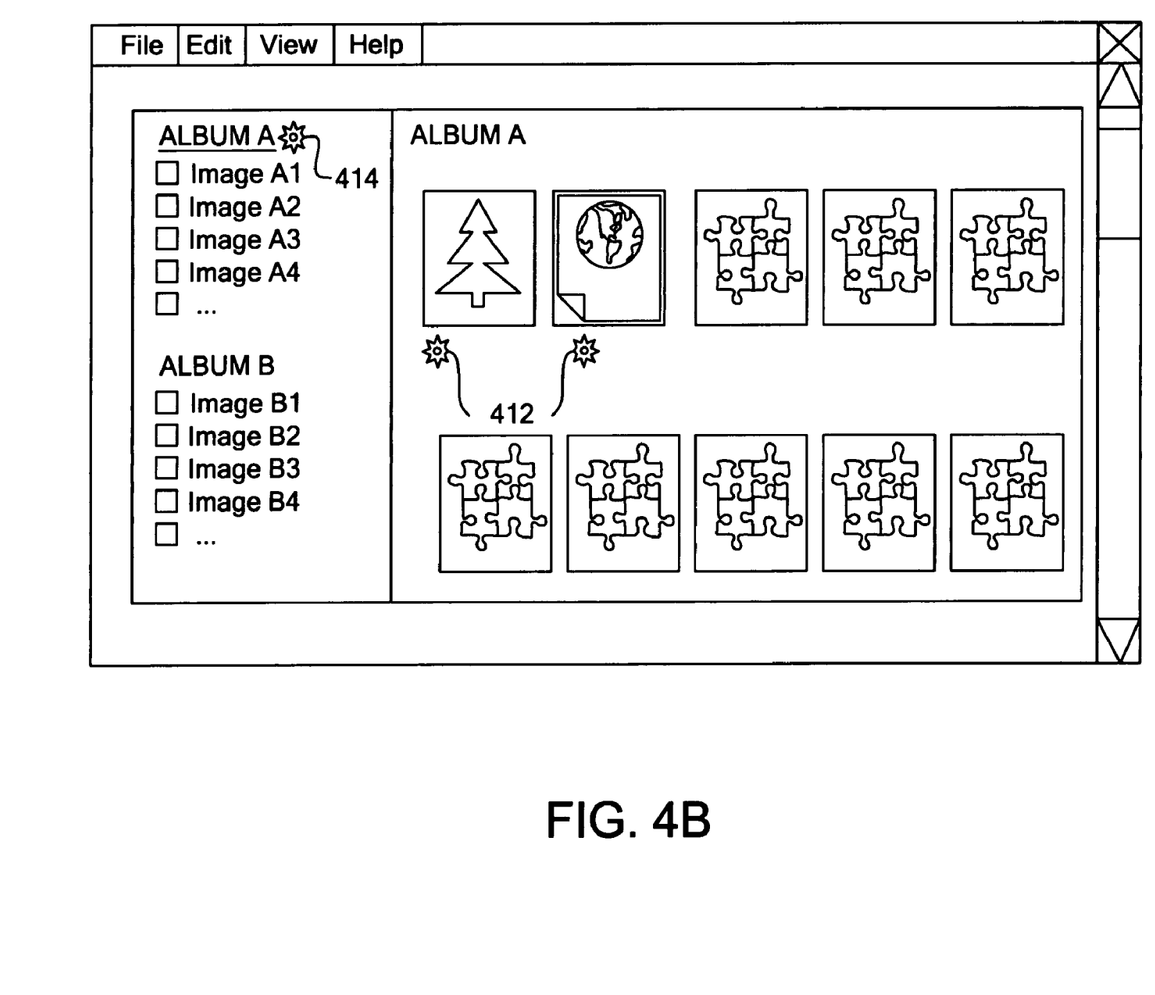
FIG. 4B depicts a screenshot of subsets with current availability of corresponding files indicated in accordance with another embodiment of the invention.

In FIGS. 4A and 4B, subsets are distributed by making available a list of subsets and indicating the availability of the corresponding file in the separate system (e.g. system$_R$). In these embodiments, distribution of the subsets includes detection of the current availability of the corresponding file in the separate system. In particular, FIG. 4A depicts a screenshot of a list of subsets with current availability of corresponding files indicated in accordance with one embodiment of the invention. In FIG. 4A, Audio clip 1 through 4 are subsets of song files, and available for listening by clicking on the text (e.g. Audio clip 1). The availability of the full song file may be indicated by textual link 410. Clicking on the link 410 may send a request to system$_C$ to transfer the full file from the separate system to the requesting system. In other embodiments, the availability of the full file may be indicated by other visual cues, such as by using icons or formatting of the subset listing with a particular text color, underline, shade or the like.

FIG. 4B depicts a screenshot of subsets with current availability of corresponding files indicated in accordance with another embodiment of the invention.

In FIG. 4B, rather than listing the subset by name, the subsets are displayed. Icons, buttons or the like 412 indicate the current availability of the corresponding file. A request for the full file may be sent by clicking on the icon, button or the like, or by clicking on the image, depending on the embodiment.

Alternatively, if a collection of subsets is available, e.g. an album of low resolution images, the availability of the entire collection may be indicated, e.g. by a flag 414 or formatting (e.g. underlining). If a collection is available, clicking on a subset in the collection may send a request to transfer the full file. The user may also be prompted to provide additional information, such as security information, before the request is sent to system$_C$.

As can be understood by reference to FIG. 4B, subsets of files stored and distributed by a central system may meet most of a user's access demands. For example, a user may upload low resolution versions of their photo collection (e.g. the images in FIG. 4B) from their home computers. Because low resolution photos have smaller file sizes than high resolution photos, uploading the subset generally takes the user less time than uploading the larger file, independent of bandwidth. These subsets may be stored on a central server using less storage space. These subsets may be viewed by the user and their friends and family. For a significant number of those images, access to the full resolution version may be excessive for viewing purposes. However, according to embodiments of this invention, full file versions may still be available on demand by sending a request for the file stored on the separate machine. Indication on a display of the current availability of those file (e.g. 412) may clarify expectations of when a request for the file may be fulfilled. For example, a user may expect to receive a file currently available within minutes, while a user may expect to receive a file not currently available within days.

Figure 5A:
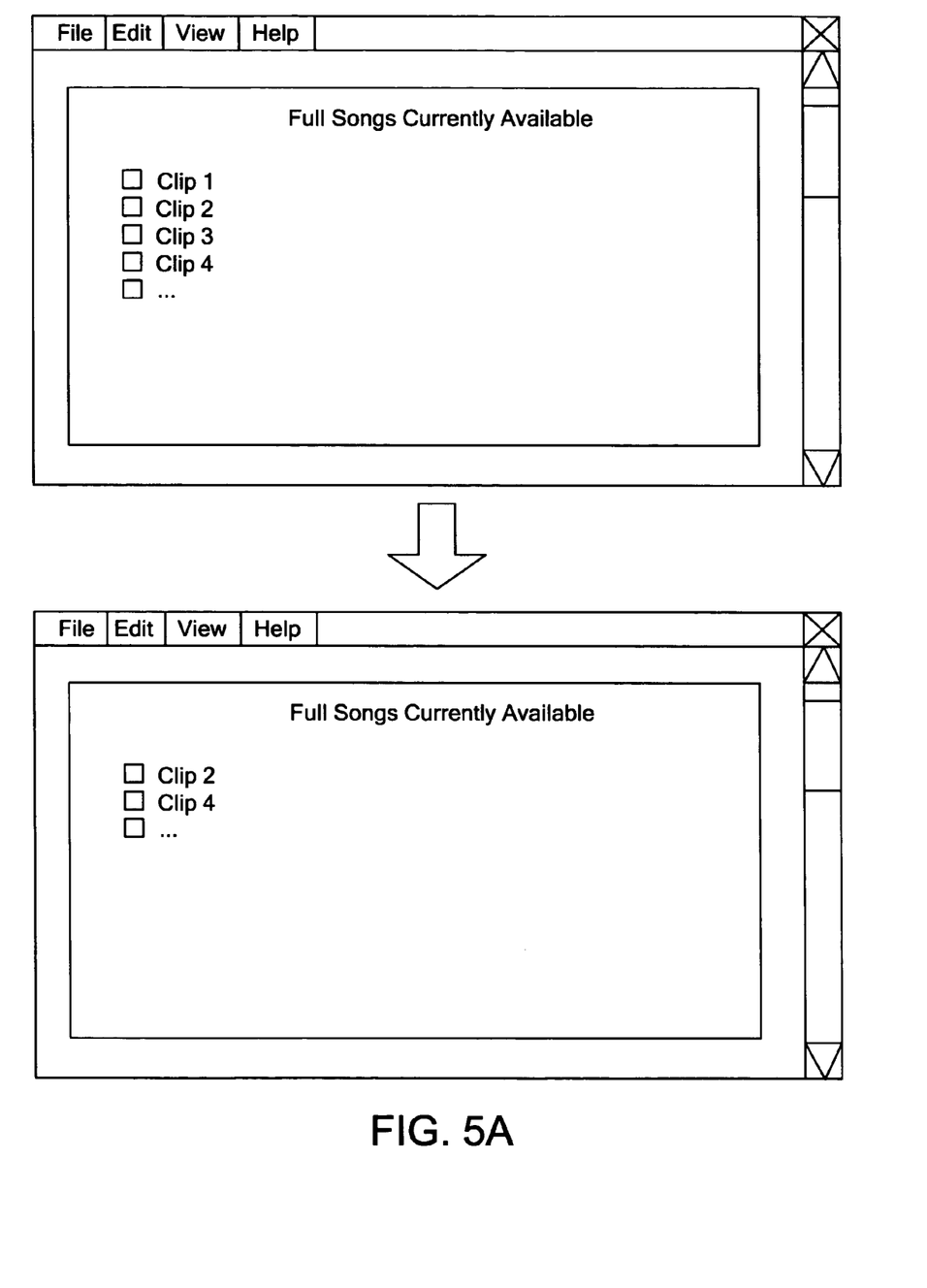
FIG. 5A depicts consecutive screenshots of a list of subsets with current availability of the subsets indicated in accordance with one embodiment of the invention.
Figure 5B:
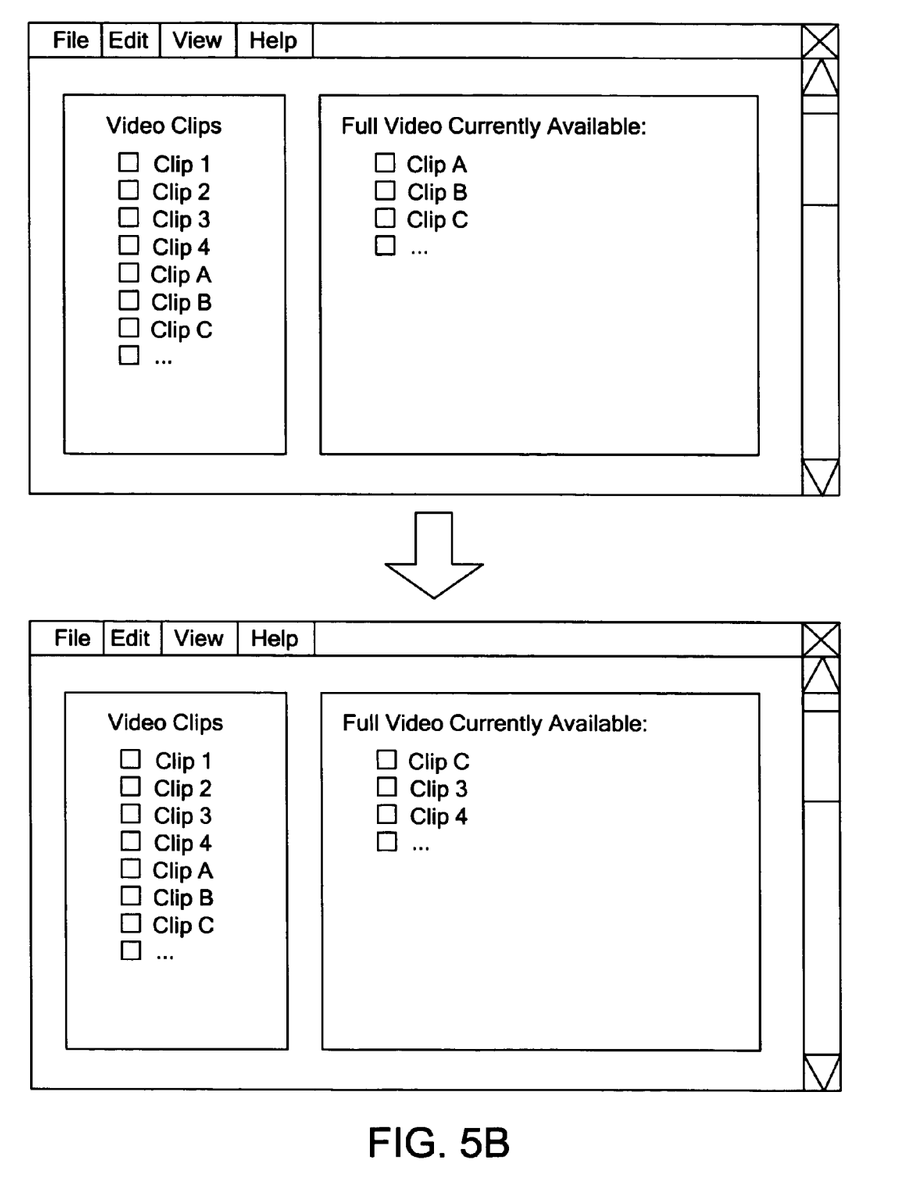
FIG. 5B depicts consecutive screenshots of another list of subsets with current availability of the subsets indicated in accordance with another embodiment of the invention.

FIGS. 5A and 5B illustrate other examples of displays indicating current availability of files. FIG. 5A depicts consecutive screenshots of a list of subsets with current availability of the subsets indicated in accordance with one embodiment of the invention. In FIG. 5A, subsets of files which are not currently available are not displayed. The subsets are removed from the display dynamically as their corresponding files become unavailable, e.g. when certain machines disconnect from the network.

Such a display may be beneficial in embodiments in which current availability of the file may equally valuable to a user as current availability of the subset. For example, in certain embodiments, a subset may be a clip of an audio or video file. Access to a clip may allow a user to preview a file, but a user may not want to preview clips of files not currently available.

Alternatively, a user may want a file regardless of a later availability. In such situations, displaying subsets of files both currently and not currently available may be useful. FIG. 5B depicts consecutive screenshots of another list of subsets with current availability of the subsets indicated in accordance with another embodiment of the invention. In FIG. 5B, files immediately available are listed separately from files which may or may not be immediately available. The lists are updated dynamically as the files become available, e.g. when certain machines connect to the network. For example, in the top screenshot of FIG. 5B, full video are available for Clips A, B and C. In the bottom screenshot of FIG. 5B, full video for Clips A and B are not longer available, and therefore no longer listed. However, full video for Clips 3 and 4 are available and therefore are listed. Thus, in the embodiment shown in FIG. 5B, a user may access subsets with currently available corresponding files, as well as those without.

Architecture

Figure 6:
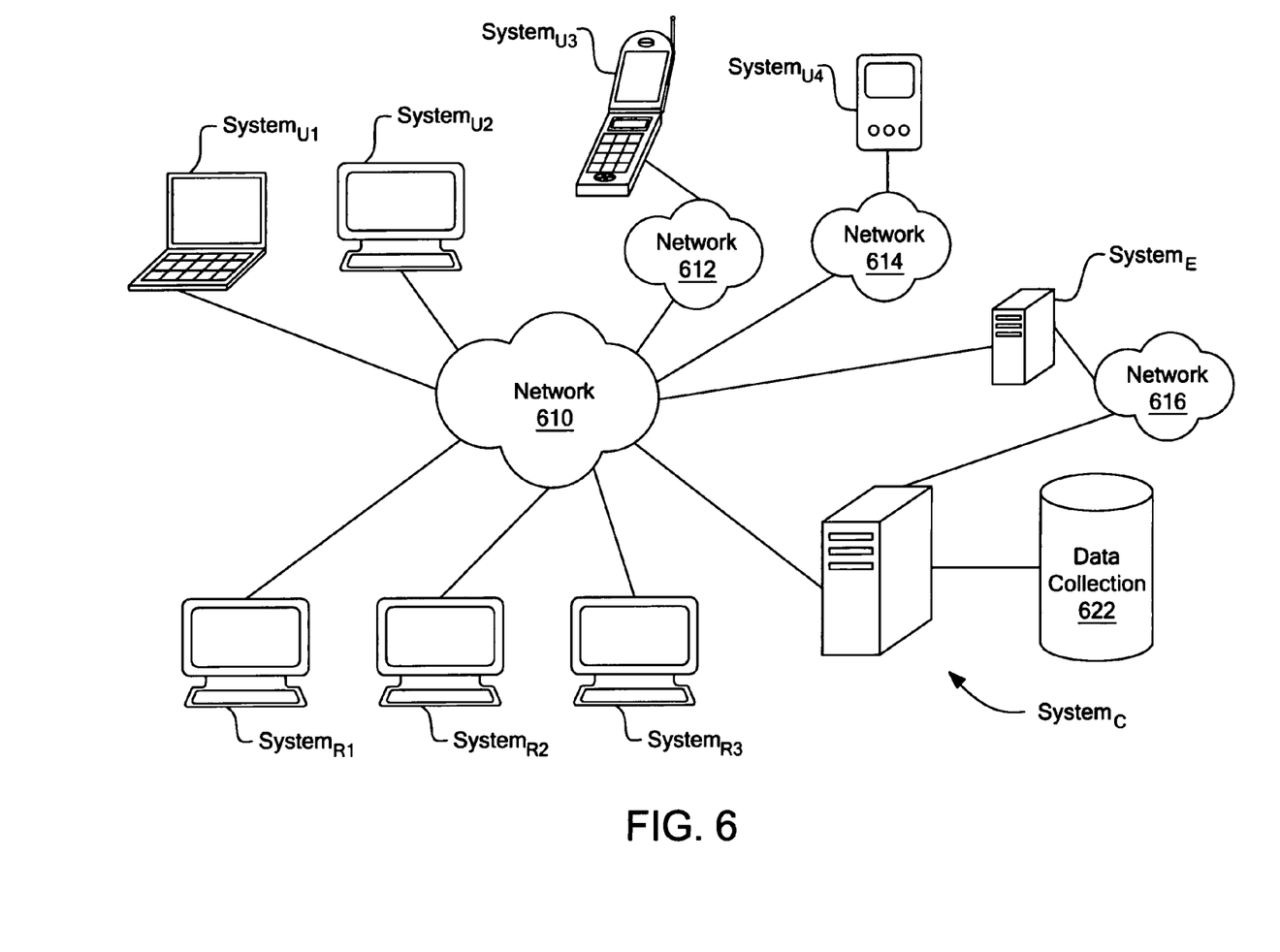
FIG. 6 depicts an environment in which files and subsets of files are stored and distributed in accordance with one embodiment of the invention.

FIG. 6 depicts an environment in which files and subsets of files are stored and distributed in accordance with one embodiment of the invention. Generally, in FIG. 6, network 610 interconnects various electronic devices. Network 610 may be defined by a media, such as a land-based network, a wireless network, a satellite network or a combination thereof. Network 610 may be defined by devices, such as a computer network, a telephone network, a cable television network, or a combination thereof. Network 610 may also be defined by a geographical connection range, such as a wide area network (WAN) (e.g. the Internet), a metropolitan area network (MAN) (e.g. a college campus network), a local area network (LAN) (e.g. an office building or household network), or a personal area network (PAN) (a wireless peripherals network).

Network 610 may use a number of communications protocols, including various combinations of protocols used at different open systems interconnection (OSI) model levels. For example, network 610 may use integrated services digital network (ISDN), point-to-point protocol (PPP), X.25, internet protocol (IP), transmission control protocol (TCP), user datagram protocol (UDP), file transfer protocol (FTP), hypertext transfer protocol (HTTP), secure shell (SSH), internet relay chat (IRC), and instant messaging (IM) protocols. The protocol used by the systems connected to the network to receive and transmit data depends on the network over which the data will travel.

For example, if network 610 is a wide area network such as the Internet, system$_C$ may use Transmission Control Protocol/Internet Protocol (TCP/IP) to receive and transmit data to the various systems. If network 610 is a wireless network, network 610 may receive and transmit data in accordance with wireless communications standards such as Bluetooth or the Institute of Electrical and Electronics Engineers (IEEE) 802 standards, e.g. IEEE std. 802.11g-2003, published Jun. 27, 2003. Network 610 may also connect to other networks to receive and transmit data to and from devices on those other networks, such as mobile telephone network 612 and personal area network 614. Furthermore, network 610 may include devices and systems such as satellites, switches, gateways and routers, such that sending and receiving data from one system to another may include sending and receiving data through intermediate devices and systems. Thus, the signals transmitted through network 610 may travel through one or more networks, through one or more systems and through landlines, airwaves, and/or a combination thereof.

In FIG. 6, $system_{R1}$ is capable of storing files and being connected to network 610. For example, in certain embodiments, $system_{R1}$ may be a network capable personal computer on which a user has stored digital photographs, music, movies, word processing files, spreadsheets or other files. In other embodiments, $system_{R1}$ may be another network capable electronic system, e.g. a game console, a personal video recorder or a personal digital assistant (PDA). In FIG. 6, $system_{R2}$ and $system_{R3}$ are also capable of storing files and being connected to network 610. Therefore, $system_C$ may store subsets of files which are distributively stored in a plurality of separate systems.

In FIG. 6, $system_C$ stores subsets in data collection 622. In the embodiment shown, data collection 622 is a separate system coupled to $system_C$, e.g. a dedicated data storage system. In other embodiments, data collection 622 may be part of $system_C$, e.g. a database in $system_C$, as previously suggested. In other embodiments, $system_C$ may store subsets of files both in $system_C$ and a separate system coupled to $system_C$.

$System_{U1}$ through $system_{U4}$ receive subsets stored in $system_C$. $System_{U1}$ through $system_{U4}$ are capable of receiving a file existing in one of $system_C$ or $system_{R1}$ through $system_{R3}$ via network 610. In certain embodiments, $system_{U1}$ through $system_{U4}$ may have limited file storage capacity, e.g. mobile telephone $system_{U3}$. In other embodiments, these systems may have greater file storage capacity, e.g. laptop $system_{U2}$. These systems may also be similar to $system_{R1}$ through $system_{R3}$. For example, $system_{U1}$ through $system_{U4}$ may be a personal computer, a game console, a personal video recorder, a PDA or the like.

$System_E$ is also connected to network 610. $System_E$ facilitates transfer of a file from one of $system_C$ or $system_{R1}$ through $system_{R3}$ to one of $system_{U1}$ through $system_{U4}$. For example, $system_E$ may be an email server to send an email to an administrator of $system_{R1}$ if a file stored on $system_R$ has been requested. In other embodiments, $system_E$ may be a chat server, an instant messenger (IM) server, a voice message system, a paging system, a text message system, or a combination thereof. $System_E$ may also be connected to $system_C$ via a separate network 616. For example, in one embodiment, network 610 is the Internet and network 616 is a secure LAN.

Figure 7:
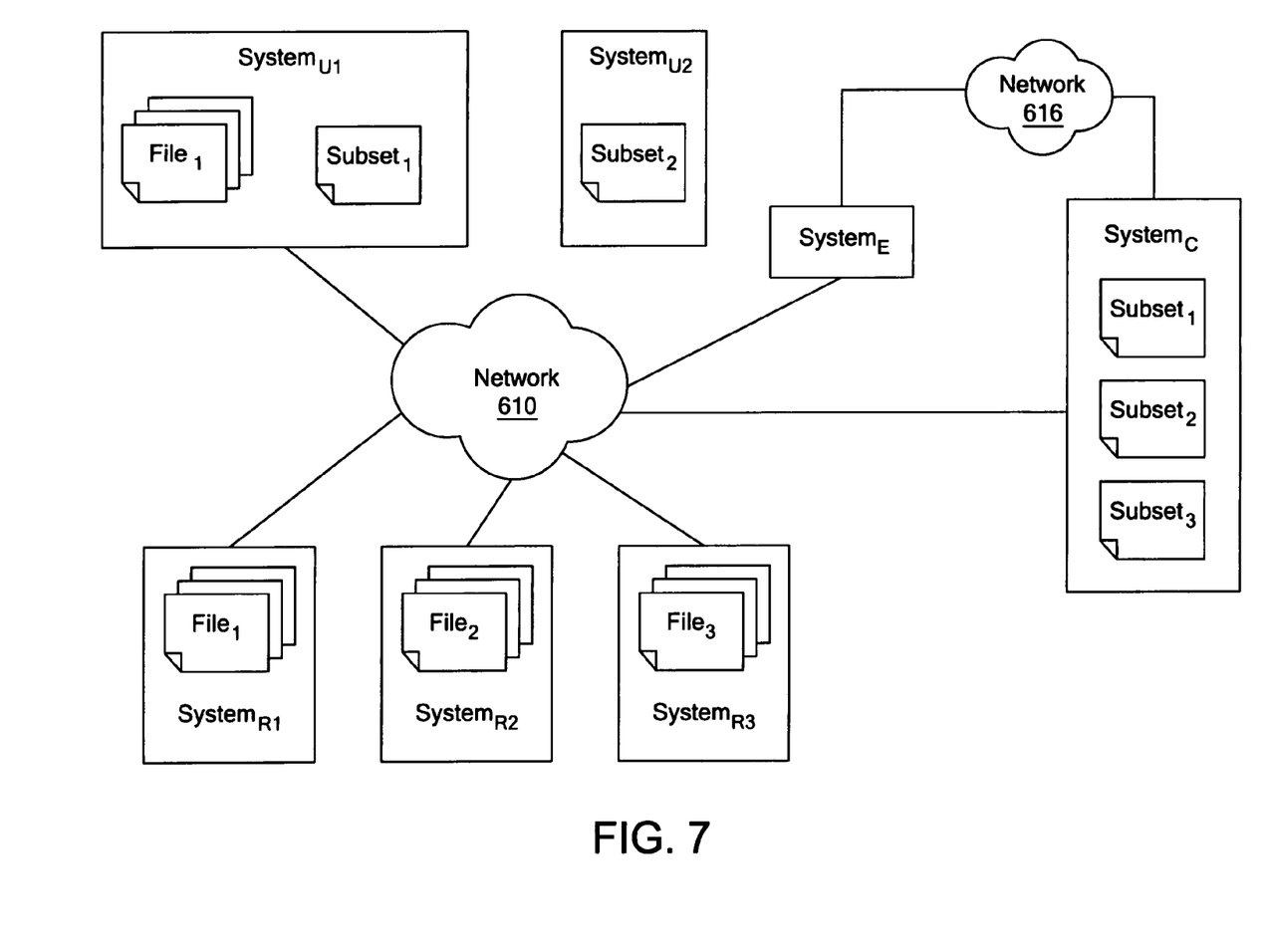
FIG. 7 depicts a diagram of various locations of files and subsets of files being stored and distributed in accordance with one embodiment of the invention.

FIG. 7 depicts a diagram of various locations of files and subsets of files being stored and distributed in accordance with one embodiment of the invention. In FIG. 7, various locations of files and subsets of files are indicated.

Specifically, in FIG. 7, $file_1$ is stored in $system_{R1}$, $file_2$ is stored in $system_{R2}$ and $file_3$ is stored in $system_{R3}$. Each of $system_{R1}$, $system_{R2}$, $system_{R3}$ also stores a subset of their respective files on $system_C$. Specifically, $subset_1$ of $file_1$, $subset_2$ of $file_2$ and $subset_3$ of $file_3$ are stored on $system_C$.

As shown in FIG. 7, $subset_1$ is distributed to $system_{U1}$ and $system_{U2}$. $System_1$ is also shown to have requested and received corresponding $file_1$. In one embodiment, $system_{U1}$ may have received file, via $system_E$ and network 616. $System_{U2}$ is shown to have not requested $file_1$, and therefore did not receive $file_1$.

CONCLUSION

Thus, a system for storing and distributing files and subsets of those files is disclosed. In the above detailed description, numerous specific details are set forth in order to provide a thorough understanding of the embodiments of the present invention. However, it will be apparent to one of ordinary skill in the art that these specific details need not be used to practice the embodiments of the present invention. In other circumstances, well-known structures, materials, or processes have not been shown or described in detail so as not to obscure the embodiments of the present invention unnecessarily.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings or may be acquired from practice of the invention. Moreover, non-dependent acts may be performed in parallel. The embodiments were chosen and described in order to best explain the principles of the invention and its practical applications, to thereby enable others skilled in the art to best utilize the invention and various embodiments with various modifications as are suited to the particular use contemplated.

Furthermore, the use of the phrase "one embodiment" throughout does not necessarily mean the same embodiment. Although these particular embodiments of the invention have been described, the invention should not be limited to these particular embodiments.

Reference to a file as used herein may include any collection of bits presented as an individual entity. The term file includes binary files, text files and file system objects accessed as though the object were a file. A file as used herein may be in a number of formats including, but not limited to, word processing document formats (e.g. rich text format (RTF)), computer-aided design (CAD) format (e.g. DXF), archive file formats (e.g. zip, cab, rar, tar or jar), image formats (e.g. joint photographic experts group (JPEG), graphics interchange format (GIF), tagged image file format (TIFF), portable network graphics (PNG), encapsulated postscript (EPS), portable document format (PDF), JPEG file interchange format (JFIF), JPEG networks graphics (JNG), Windows bitmap (BMP) or device independent bitmap (DIP)), and combinations thereof.

Reference to a server as used herein may include a software application that carries out tasks on behalf of users such as file serving, application serving, web serving, mail serving, email serving, image server, and the like. The term server as used herein also includes any physical device on which such software is executed, such as a mainframe, a minicomputer, a personal computer, a dedicated server machine, and the like.

Reference to a client as used herein may include any system that accesses a service on another system by some kind of network. These clients include, but are not limited to, terminals, personal computers, thin clients, personal digital assistants (PDAs), mobile telephones, pagers, wireless handheld devices, game consoles and televisions.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, magnetic optical disks, read only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or writing the media in question. Specialty apparatus may include a collection of readily available pieces or an application specific integrated circuit (ASIC) including a series of logic blocks, for example.

The displays presented herein are not inherently related to any particular computer or other apparatus. Various general purpose systems may be used with programs in accordance with the teachings herein or it may be convenient to construct more specialized apparatus to perform the required method. For example, any of the methods according to the present invention can be implemented in hard wired circuitry by programming a general purpose processor or by any combination of hardware and software.

It will be appreciated that the invention can be practiced with systems such as stand-alone computers, hand held devices, multi-processor systems, microprocessor based or programmable consumer electronics, network personal computers, mainframe computers and the like.

The method of the invention may be implemented using computer software. If written in a programming language conforming to a recognized standard sequence of instructions, the methods can be compiled for execution on a variety of hardware platforms or machines and for interface to a variety of operating systems. In addition the present invention is not described with reference to any particular programming language. It will be appreciated that a variety of programming languages may be used to implement the teachings of the invention as described herein.

What is claimed is:

1. A method, comprising:
    receiving, at a first system, units of information targeted for storage at the first system, wherein each unit of information includes a reduced-size version of a file that corresponds to one of a plurality of full-sized versions of files distributively stored in other systems including a second systems having a network connection, wherein the reduced-size version of the file is a subset of data of a full-sized version of a corresponding file;
    storing the units of information in the first system;
    receiving at the first system a first request from a third system, the first request to be for a unit of information corresponding to a requested file stored in the second system and the first request to be independent of the second system's network connection, wherein receiving the first request for the unit of information is in response to the requested file stored in the second system being unavailable for transferring to the third system, the unit of information including a reduced size version of the requested file stored in the second system, the requested file stored in the second system being a full-sized version that is not available on the first system;
    transmitting the unit of information from the first system to the third system;
    receiving at the first system a second request from the third system, the second request to be for the requested file stored in the second system;
    detecting availability of the second system and availability of the requested file stored in the second system;
    the first system downloading the requested file from the second system for storage at the first system in response to the second system being detected as available;
    detecting a change in status of the third system from unavailable to available; and
    initiating a process to transfer the requested file from the first system to the third system in response to the third system being detected as available.

2. The method of claim 1, wherein the unit of information comprises metatdata relating to the file.

3. The method of claim 1, wherein the unit of information comprises a content-related subset of the file.

4. The method of claim 3, wherein the file comprises at least one of a digital image file, an audio file, or a video file, and the content-related subset comprises at least one of a lower resolution version of the image file, a clip of the audio file, or a section of the document.

5. The method of claim 1, wherein the units of information include another unit of information corresponding to another file stored in the third system.

6. The method of claim 1, wherein detecting availability of the file comprises detecting presence of an active network connection for exchanging data.

7. The method of claim 1, wherein the process to transfer the requested file comprises communicating with a fourth system not included in the first, second, or third systems if the second system is not available.

8. The method of claim 7, wherein the fourth system is selected from a group consisting of an electronic mail server, an instant messaging server, a chat server, a text message system, a voicemail system, a paging system and a telephone system.

* * * * *